United States Patent [19]

Westphal

[11] 4,334,795
[45] Jun. 15, 1982

[54] BALL AND SOCKET JOINT

[75] Inventor: Paul Westphal, Lemförde, Fed. Rep. of Germany

[73] Assignee: Lemförder Metallwaren AG, Fed. Rep. of Germany

[21] Appl. No.: 252,344

[22] Filed: Apr. 9, 1981

[30] Foreign Application Priority Data

Jul. 30, 1980 [DE] Fed. Rep. of Germany ....... 3028869

[51] Int. Cl.³ ............................................. F16C 11/06
[52] U.S. Cl. .................................... 403/131; 403/140
[58] Field of Search .............. 403/131, 130, 128, 129, 403/132, 133, 127, 140, 77

[56] References Cited

U.S. PATENT DOCUMENTS 2,942,901  6/1960  Booth .................................. 403/129
2,999,710  9/1961  Latzen ............................. 403/130 X

FOREIGN PATENT DOCUMENTS 2404853  8/1974  Fed. Rep. of Germany ...... 403/132
 655735  8/1951  United Kingdom ................ 403/132
1106718  3/1968  United Kingdom ................ 403/127

Primary Examiner—Andrew V. Kundrat
Attorney, Agent, or Firm—McGlew and Tuttle

[57] ABSTRACT

A ball and socket joint for steering linkages of motor vehicle steering devices comprises a housing which has an open end with an interior generally spherical recess having a spherical bearing body therein with a cylindrical bore aligned with the open end. The link pin has a cylindrical shank portion extending through the cylindrical bore and terminated in an inner end of semi-spherical configuration which is spaced from the inner end of the recess by a gap and the head portion is spaced from the semi-spherical bearing body by an annular recess. A thrust spring embraces the pin and elastically supports the pin in the bearing body. The thrust spring comprises an outer metal sleeve and an inner metal sleeve with a central elastic sleeve therebetween.

4 Claims, 1 Drawing Figure

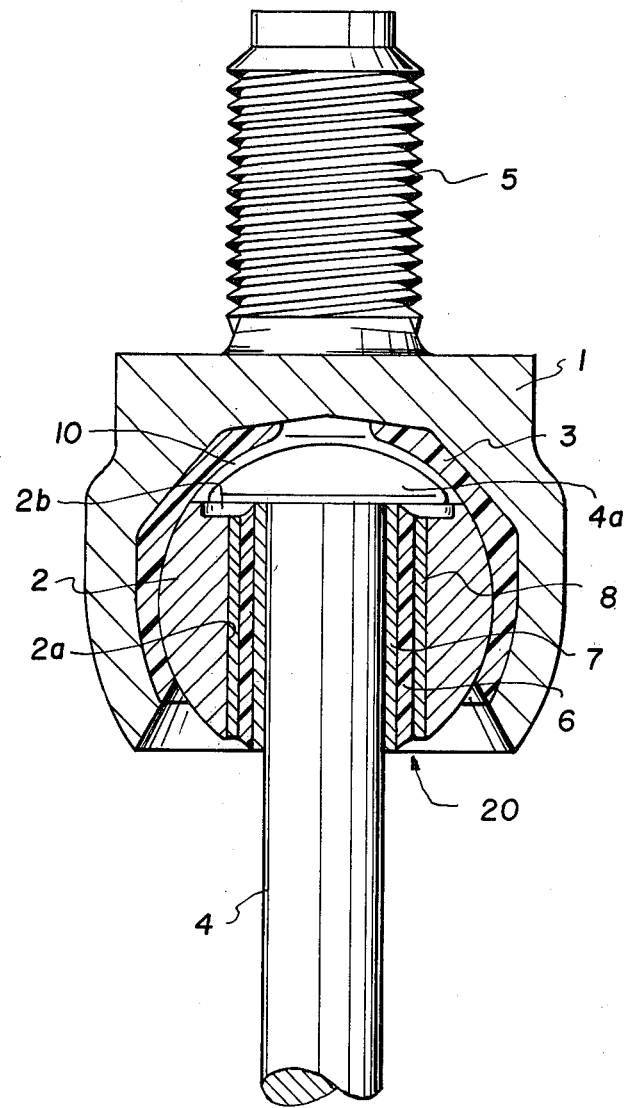

BALL AND SOCKET JOINT

FIELD AND BACKGROUND OF THE INVENTION

The invention relates in general to pivot joints and in particular to a new and useful ball and socket joint, in particular for steering linkages of motor vehicle steering devices, wherein the axial forces are transmitted to the steering linkage by a thrust spring of elastomeric material.

For the transmission and damping of forces and shocks occurring preferably in axial directions, it is known in motor vehicle steering devices to arrange spring means inside the steering linkage. Preferably there are used for this purpose thrust springs which are provided at suitable points in the linkage in the region contiguous to the ball and socket joints interconnecting the steering and tie rods.

It is further known in this connection to arrange the thrust spring in the immediate vicinity of the connecting joints, namely in a prolongation of the joint housing extending beyond the suspension of the ball body; see German Utility Model No. DE-GM 77 18 994 and German Patent Disclosure No. DE-Os 26 55 353. The thrust spring here embraces the junction ends of a link, or of a tie rod.

By the interposition of thrust springs, the shocks and vibrations originating from the steered wheels are absorbed noiselessly and are kept away from the steering column and steering wheel, and the steering forces are transmitted without impairment of the control.

These known damping devices, however, have the disadvantage that the actual joint housing containing the joint parts must be made very long to be able to accommodate the thrust spring. In the usual steering devices of motor vehicles it is oten very difficult or even impossible to accommodate ball and socket joints of relatively great structural length in a compact manner; they should, therefore, not exceed the size of a normal ball and socket joint, if possible. The longer designs, moreover, cause greater expense and use of more material, necessarily resulting in higher manufacturing costs.

SUMMARY OF THE INVENTION

The invention provides a ball and socket joint by which the structural size normal for universal angular movements are maintained and at the same time tensile and shearing forces are transmitted to the steering linkage which is damped in axial directions for the main purpose of improving the possibilities of installation inside the steering linkage and simplifying the forms known until now.

In accordance with the invention there is provided a ball and socket joint for steering linkages of motor vehicle steering devices which comprises a housing which has an open end with an interior generally spherical recess and has a closed end with a stud pin thereon. The semi-spherical bearing body having a cylindrical bore which is aligned with the opening is positioned in the recess. The link pin has a cylindrical shank portion extending through the cylindrical bore and has an inner end of semi-spherical form which is spaced on its semi-spherical end face from the interior of the recess and by its collar portion under the head from the semi-spherical bearing body. The link pin is supported by thrust spring which embraces the pin and elastically supports it in the bearing body.

Accordingly, it is an object of the invention to provide an improved ball and socket joint which has a thrust spring elastically supporting a link pin in a semi-spherical bearing body.

A further object is to provide a ball and socket joint which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which a preferred embodiment of the invention is illustrated.

BRIEF DESCRIPTION OF THE DRAWING

The only FIGURE of the drawings is an axial sectional view of a ball and socket joint for a steering linkage constructed in accordance with the invention.

DESCRIPTION OF THE PREFERRED EMBODIMENT

In the ball and socket joint shown in partial longitudinal section, the joint housing is designated 1 and has the usual size required for receiving the joint parts. In the joint housing, a semi-spherical bearing body 2 of metal is mounted in a bearing shell 3 made of elastomeric material. The joint body has a continuous cylindrical bore 2a, which is traversed by the link pin 4 which carries a part-spherical head 4a by which the pin can take support against the bearing body 2. On its closed side, the housing 1 carries a threaded stud portion 5 for the connection to a linkage part (not shown) for example, the tie rod or rack of a rack and pinion steering device.

In the cylindrical bore 2a, between the bearing body 2 and the shank of the link pin 4, a thrust spring 20 of elastomeric material is lock-fitted, through which the forces and shocks acting in axial direction are transmitted, damped to the steering linkage. The thrust spring 20 comprises a sleeve 6 of rubber elastic material which is embraced adheringly by an inner metal sleeve 7 and an outer metal sleeve 8. The joining of the sleeves is expediently done by vulcanizing.

In the surface of the bearing body 2 there is provided an annular recess 2b surrounding the link pin, while between the arched surface of the pin head 4a and the elastic bearing shell 3 a gap 10 is provided, and these make possible the required path of the thrust spring.

While a specific embodiment of the invention has been shown and described in detail to illustrate the application of the principles of the invention, it will be understood that the invention may be embodied otherwise without departing from such principles.

What is claimed is:

1. A ball and socket joint for steering linkages of motor vehicle steering devices, comprising a housing having an open end with an interior generally spherical recess, a semi-spherical bearing body in the recess having a cylindrical bore aligned with the open end, a link pin having a cylindrical shank portion extending through the cylindrical bore and having an inner end terminating in a semi-spherical head portion overlying said semi-spherical bearing body, a thrust spring embracing said pin and elastically supporting said pin in said bearing body, wherein said thrust spring comprises an elastic bushing, an inner and an outer sleeve arranged on respective sides of said bushing, said inner sleeve being fixed to said link pin while said outer sleeve being fixed in a bore of said bearing body.

2. A ball and socket joint according to claim 1, wherein said inner and outer sleeves are metal.

3. A ball and socket joint according to claim 2, wherein said bearing body includes an annular recess adjacent one end, said semi-spherical head portion being spaced from said one end of said bearing body, said recess having a gap between said spherical head portion and the inner end of said recess.

4. A ball and socket joint for elastically connecting steering linkages of motor vehicles steering devices, the joint being of the type having a thrust spring for transmitting axial forces, comprising a housing having an open end with an interior generally spherical recess, a semi-spherical bearing body in the recess having a cylindrical bore aligned with the open end, a link pin having a cylindrical shank portion extending through the cylindrical bore and having an inner end terminating in a semi-spherical head portion overlying said semi-spherical bearing body, the thrust spring embracing said pin in the cylindrical bore and elastically supporting said pin in said bearing body, and said thrust spring comprising an elastomer material wherein said bearing body includes an annular recess adjacent one end so that said semi-spherical head portion is spaced from said one end of said bearing body, said interior generally spherical recess providing a gap between said spherical head portion and the spherical end of said recess.

* * * * *